(12) United States Patent
Kawahara et al.

(10) Patent No.: US 7,938,940 B2
(45) Date of Patent: May 10, 2011

(54) SUPPORT FOR OXYGEN SEPARATION MEMBRANE ELEMENT AND THE ELEMENT USING THE SAME

(75) Inventors: Akihiro Kawahara, Nagoya (JP); Shigeo Nagaya, Nagoya (JP); Hiroshi Seo, Nagoya (JP)

(73) Assignees: Noritake Co., Limited, Nagoya (JP); Chubu Electric Power Co., Inc., Nagoya (JP)

( * ) Notice: Subject to any disclaimer, the term of this patent is extended or adjusted under 35 U.S.C. 154(b) by 879 days.

(21) Appl. No.: 11/878,887

(22) Filed: Jul. 27, 2007

(65) Prior Publication Data

US 2008/0078675 A1    Apr. 3, 2008

(30) Foreign Application Priority Data

Aug. 3, 2006    (JP) ................................ 2006-212533

(51) Int. Cl.
    *C25B 13/02*    (2006.01)
    *C25B 13/04*    (2006.01)
    *C25C 7/04*    (2006.01)

(52) U.S. Cl. ........ 204/295; 204/252; 204/263; 204/266; 429/497; 429/529; 429/532; 429/534; 95/45; 95/54; 96/10

(58) Field of Classification Search .............. 429/31, 429/32, 33, 34, 38, 39, 41, 44, 497, 529, 429/532, 534; 204/260, 286.1, 297.01, 295, 252, 263, 266; 95/45, 54; 96/10
See application file for complete search history.

(56) References Cited

U.S. PATENT DOCUMENTS

| | | | | |
|---|---|---|---|---|
| 5,112,544 A | * | 5/1992 | Misawa et al. | 156/89.11 |
| 5,188,910 A | * | 2/1993 | Ishihara et al. | 429/31 |

FOREIGN PATENT DOCUMENTS

| | | |
|---|---|---|
| JP | B2 6-69907 | 9/1994 |
| JP | A 9-87024 | 3/1997 |
| JP | A 9-132459 | 5/1997 |
| JP | B2 2813596 | 8/1998 |
| JP | A 11-99324 | 4/1999 |
| JP | A 2002-83517 | 3/2002 |
| JP | A 2002-97083 | 4/2002 |
| JP | A 2002-292234 | 10/2002 |
| JP | A 2003-210952 | 7/2003 |
| JP | B2 3540495 | 4/2004 |

* cited by examiner

*Primary Examiner* — Bruce F Bell
(74) *Attorney, Agent, or Firm* — Oliff & Berridge, PLC (57) ABSTRACT

A support for an oxygen separation membrane element to support a dense and cylindrical electrolytic membrane having oxygen ion permeability, comprises a base axially extending and having a cylindrical surface extending axially, and a plurality of ribs formed on the cylindrical surface of the base, radially projecting and axially extending, for supporting the electrolytic membrane at their ends being radially distant from the cylindrical surface of the base.

1 Claim, 4 Drawing Sheets

SUPPORT FOR OXYGEN SEPARATION MEMBRANE ELEMENT AND THE ELEMENT USING THE SAME

This application is based on Japanese Patent Application No. 2006-212533 filed Aug. 3, 2006, the contents of which are incorporated hereinto by reference.

BACKGROUND OF THE INVENTION

1. Field of the Invention

The present invention relates to a support for an oxygen separation membrane element and the element using the same.

2. Description of Related Art

For example, an oxygen separation membrane element using a mixed conductor solid electrolytic membrane is known. A thinner electrolytic membrane provides higher speed of oxygen transport and, accordingly, higher separability or higher capability of separation. Grounded upon this, a porous support having a plurality of pores which penetrates in the thickness direction, on which a thin electrolytic membrane is formed, is employed for supporting the membrane thereon to be a structure of asymmetric membrane, in order to achieve mechanically sufficient strength, instead of using the sole membrane, as disclosed in JP 2813596 B and JP 2003-210952 A.

It is considered that the oxygen separation membrane element formed as such as a cylindrical shaping, or a pipe shaping, is preferred for a practical use such as a gaseous separation membrane element in a chemical plant, as disclosed in JP 2002-083517 A and JP 2002-292234 A. A cylindrical element is useful and easy to manage in sealing and building a large apparatus with a number of it in comparison with a laminated plate structure. Furthermore, it is advantageous that a small-sized apparatus having a plurality of elements closely located one another and bundled can be provided.

As discussed above, the cylindrical porous support is advantageous for practical use and spread. However, with an asymmetric membrane structure, gaseous diffusion (capability) of the porous support directly affects the capability of the apparatus. Accordingly, a support of high gaseous diffusion capability is required for fabricating an oxygen separation membrane element of high separability. And a support having high mechanical strength and of high affinity with the electrolytic membrane is required for fabricating an oxygen separation membrane element having high durability. Furthermore, easy and low-cost fabrication is expected for practical use.

Various materials, pore forming agents to be added, burning methods and so on have been suggested for fabricating the porous support to support the electrolytic membrane. JP 06-069907 B1, for example, discloses a support of $La_{1-x}Sr_xMnO_3$ which is synthesized at 1000-1400° C., ground to be 2-10 μm in an average diameter, formed, and burnt at 1300-1600° C. JP 2002-097083 A, for instance, discloses a porous support which is a formed and burnt mixture of mixed conductor oxide material of $AFe_xO_{3-\delta}$ (where A is at least one selected from a group of Ba, Sr and Ca) and resin. It shows a way to change the porosity by controlling the amount of resin to be mixed, the forming pressure and/or the burning temperature. JP 2003-210952 A, for example, discloses another support. A mixture of $ABB'O_3$ (where A is a metallic component coordinated by twelve oxygen atoms, and B and B' are components each coordinated by six oxygen atoms) and carbon beads is formed, burnt in an oxidization mood to burn out the carbon beads to form pores in which the carbon beads were present. JP 09-132459 A and JP 09-087024 A disclose another supports. A mixture of lanthanum series perovskite material and fine carbon powder having a large specific surface area, for instance, carbon powder of 1-10 μm in the average diameter having not less than 200 $m^2/g$ of the specific surface area, is burnt in the oxidization mood to burn out the carbon powder to form the pore. Any one of the above-mentioned methods provides the porous support having a pore diameter and porosity such that the pores do not impede the oxygen transport.

The recent development of the solid electrolytic membrane and catalyst in their quality or capability causes such a situation where the quality or capability of the oxygen separation membrane element depends upon the gaseous diffusion (capability) of the porous support. As a result of it, the further development of the gaseous diffusion (capability) of the porous support is sought.

Table 1 shows the relationship between the theoretical amount of oxygen diffusion, thickness of the membrane and porosity of a porous support fabricated such that the support has not been perfectly sintered (referring to as the "Imperfect Sintering Method") as shown in JP 06-069907 B1 and JP 2002-097083 A. These theoretical amounts are calculated in Equation 1, Fick's equation, shown below. The permeation (amount) N in Equation 1 corresponds to the theoretical amount of oxygen diffusion in Table 1. A value between 1 and 6 is in general applied to the tortuosity factor $\tau$ that is reflective of the porous structure, and, for instance, a value of about 4 ($\tau=4$) is often applied to the conventional porous structure. Dg is a corrected value of the diffusion constant Do in consideration of the temperature and pressure, and the effective diffusion constant Dg' is a corrected value of the diffusion constant Dg with the porosity $\alpha$ and the tortuosity factor $\tau$. Then m is a constant reflective of the "rigidity" or "hardness" of molecules and a value in a range of 1.5-2.0 is applied to it, for example, a value of 1.75 is applied to m (m=1.75) for an oxygen molecule. The diffusion coefficient Do of oxygen in the air at To and Po is 0.178 ($cm^2$/sec). The distance x corresponds to the thickness of the support.

TABLE 1

Theoretical Amount of Oxygen Diffusion in Imperfect Sintering Method (cc/min/$cm^2$)

| Porosity (%) | Thickness of Support (mm) | | | | | | | | | | | | |
|---|---|---|---|---|---|---|---|---|---|---|---|---|---|
| | 0.2 | 0.4 | 0.6 | 0.8 | 1.0 | 1.2 | 1.4 | 1.6 | 1.8 | 2.0 | 2.2 | 2.4 | 2.6 |
| 10 | 8.9 | 4.5 | 3.0 | 2.2 | 1.8 | 1.5 | 1.3 | 1.1 | 1.0 | 0.9 | 0.8 | 0.7 | 0.7 |
| 20 | 17.8 | 8.9 | 5.9 | 4.5 | 3.6 | 3.0 | 2.5 | 2.2 | 2.0 | 1.8 | 1.6 | 1.5 | 1.4 |
| 30 | 26.7 | 13.4 | 8.9 | 6.7 | 5.3 | 4.5 | 3.8 | 3.3 | 3.0 | 2.7 | 2.4 | 2.2 | 2.1 |
| 40 | 35.6 | 17.8 | 11.9 | 8.9 | 7.1 | 5.9 | 5.1 | 4.5 | 4.0 | 3.6 | 3.2 | 3.0 | 2.7 |
| 50 | 44.5 | 22.3 | 14.9 | 11.1 | 8.9 | 7.4 | 6.4 | 5.6 | 5.0 | 4.5 | 4.1 | 3.7 | 3.4 |
| 60 | 53.4 | 26.7 | 17.8 | 13.4 | 10.7 | 8.9 | 7.6 | 6.7 | 5.9 | 5.3 | 4.9 | 4.5 | 4.1 |

TABLE 1-continued

Theoretical Amount of Oxygen Diffusion in Imperfect Sintering Method (cc/min/cm²)

| Porosity (%) | Thickness of Support (mm) | | | | | | | | | | | | |
|---|---|---|---|---|---|---|---|---|---|---|---|---|---|
| | 0.2 | 0.4 | 0.6 | 0.8 | 1.0 | 1.2 | 1.4 | 1.6 | 1.8 | 2.0 | 2.2 | 2.4 | 2.6 |
| 70 | 62.3 | 31.2 | 20.8 | 15.6 | 12.5 | 10.4 | 8.9 | 7.8 | 6.9 | 6.2 | 5.7 | 5.2 | 4.8 |
| 80 | 71.2 | 35.7 | 23.8 | 17.8 | 14.3 | 11.9 | 10.2 | 8.9 | 7.9 | 7.1 | 6.5 | 5.9 | 5.5 |
| 90 | 80.1 | 40.1 | 26.7 | 20.1 | 16.0 | 13.4 | 11.5 | 10.0 | 8.9 | 8.0 | 7.3 | 6.7 | 6.2 |

Fick's Equation $$N = -\frac{Dg'}{RT}\frac{dp}{dx} = -Dp\frac{dp}{dx} \quad \text{Eq. 1}$$

where $Dg' = \alpha\, Dg/\tau$, $Dg = Do\,(T/To)^m\, Po/P$;

$N$ (mol/sec/cm²): Amount of permeation;

$Dg$ (cm²/sec): Diffusion constant at a specified temperature $T$ and under a specified pressure $P$;

$Dp$ (mol/cm/sec/Pa): Diffusion constant per a specified pressure;

$Dg'$ (cm²/sec): Effective diffusion constant;

$Do$ (cm²/sec): Diffusion constant at the temperature $To$ (=273 K) and under the pressure $Po$ (=1.01325×10⁵ Pa);

$\alpha$: Porosity;

$\tau$: Tortuosity factor;

$R$ (J/K/mol): Gas constant (=8.31);

$T$ (K): Temperature;

$x$ (cm): Distance;

$P$ (Pa): Pressure;

$m$: Constant reflective of the "rigidity" of molecules;

As apparent in Table 1, the smaller the porosity is and the thicker the thickness of the support is, the smaller the theoretical amount of oxygen diffusion becomes. It is experimentally found that the thickness of not less than 2 mm of the support is required for mechanically sufficient strength. Provided that grains in a porous support are in contact with one another, the porosity of the porous support fabricated in the Imperfect Sintering Method reaches 40% in maximum. The mechanical strength of a support remarkably reduces since the bound points between the grains reduce if the percentage exceeds 40%. Consequently, the practical amount of oxygen diffusion can be taken only from an area at the upper right, with the thickness of not less than 2 mm and the porosity of not larger than 40%, in Table 1. Then the theoretical amount of oxygen diffusion is limited in the range of 0.7-3.6 cc/min/cm² as shown in Table 1. As a result, a small amount of oxygen diffusion of the support has impeded an increase of the oxygen permeation amount of the oxygen separation membrane element, even with improvements in capabilities of the solid electrolytic membrane and others.

There is suggested a porous support fabricated using electrolytic material. It increases the reached oxygen amount to the electrolytic membrane because not only oxygen molecules permeate through pores of the porous support but also oxygen ions that are ionized permeate through the structure of the electrolytic material. Disadvantageously, the support is required to be thicker to achieve the equal mechanical strength to the conventional one because the electrolytic material is more fragile (lower in mechanical strength) in itself than such as alumina that is employed for the conventional one. Consequently, the amount of oxygen diffusion cannot be increased, and then it is difficult to sufficiently increase the amount of oxygen permeation.

JP 3540495 B and JP 11-099324 A disclose an instance of a separation membrane element having the membrane on the support. It is a hydrogen separation membrane element having a support of a metallic base pipe with a plurality of through-holes for ventilation and a metallic layer capable of hydrogen permeation on the outer surface of the support. Such through-holes that linearly extend in the thickness direction of the support provide remarkably smaller ventilation resistance than bent pores which extend through in the thickness direction of the support. Consequently, the capability of gaseous diffusion can be remarkably improved. Table 2 shows the relationship between the theoretical amount of oxygen diffusion, thickness of the membrane and porosity of a porous support having through-holes. It is found in Table 2 that the amount of oxygen permeation can be remarkably increased.

TABLE 2

Theoretical Amount of Oxygen Diffusion through Through-holes (cc/min/cm²)

| Porosity (%) | Thickness of Support (mm) | | | | | | | | | | | | |
|---|---|---|---|---|---|---|---|---|---|---|---|---|---|
| | 0.2 | 0.4 | 0.6 | 0.8 | 1.0 | 1.2 | 1.4 | 1.6 | 1.8 | 2.0 | 2.2 | 2.4 | 2.6 |
| 10 | 35.6 | 17.8 | 11.9 | 8.9 | 7.1 | 5.9 | 5.1 | 4.5 | 4.0 | 3.6 | 3.2 | 3.0 | 2.7 |
| 20 | 71.2 | 35.7 | 23.8 | 17.8 | 14.3 | 11.9 | 10.2 | 8.9 | 7.9 | 7.1 | 6.5 | 5.9 | 5.5 |
| 30 | 106.8 | 53.5 | 35.7 | 26.7 | 21.4 | 17.8 | 15.3 | 13.4 | 11.9 | 10.7 | 9.7 | 8.9 | 8.2 |
| 40 | 142.4 | 71.3 | 47.5 | 35.7 | 28.5 | 23.8 | 20.4 | 17.8 | 15.8 | 14.3 | 13.0 | 11.9 | 11.0 |
| 50 | 178.0 | 89.1 | 59.4 | 44.6 | 35.7 | 29.7 | 25.5 | 22.3 | 19.8 | 17.8 | 16.2 | 14.9 | 13.7 |
| 60 | 213.6 | 107.0 | 71.3 | 53.5 | 42.8 | 35.7 | 30.6 | 26.7 | 23.8 | 21.4 | 19.4 | 17.8 | 16.5 |
| 70 | 249.2 | 124.8 | 83.2 | 62.4 | 49.9 | 41.6 | 35.7 | 31.2 | 27.7 | 25.0 | 22.7 | 20.8 | 19.2 |
| 80 | 284.8 | 142.6 | 95.1 | 71.3 | 57.0 | 47.5 | 40.7 | 35.7 | 31.7 | 28.5 | 25.9 | 23.8 | 21.9 |
| 90 | 320.4 | 160.4 | 107.0 | 80.2 | 64.2 | 53.5 | 45.8 | 40.1 | 35.7 | 32.1 | 29.2 | 26.7 | 24.7 |

The base pipe in JP 3540495 B and JP 11-099324 A is prepared for a metallic porous support for hydrogen separation and cannot serve by itself for oxygen separation. The support for oxygen separation that is formed of ceramic is preferred in order to achieve anti-reduction, anti-moisture and high mechanical strength because it is disclosed at high temperature, under high pressure, in a reduction mood and moisture mood. A metallic cylinder is easy to provide with through-holes on it, however, a ceramic cylinder that is hard to machine, that is, inferior in machinability, is considerably difficult to provide with a plurality of through-holes on it. To provide a molded or sintered support with through-holes by machining as shown in JP 3540495 B and JP 11-099324 A requires much hard labor because only one to a few, not reaching ten holes in maximum, through-holes can be provided. Furthermore, complex control is required to form through-holes on a curved surface, to realize accuracies in such as positioning, dimensions and shaping.

It is therefore an object of the present invention to provide a support for oxygen separation membrane element that has high capability in gaseous diffusion and is easy to fabricate, and oxygen separation membrane element having the membrane with high performance in its oxygen permeation speed.

SUMMARY OF THE INVENTION

The object indicated above may be achieved according to a first aspect of the invention, which provides a support for an oxygen separation membrane element to support a dense and cylindrical electrolytic membrane having oxygen ion permeability, comprises (a) a base axially extending and having a cylindrical surface extending axially, and (b) a plurality of ribs formed on the cylindrical surface of the base, radially projecting and axially extending, for supporting the electrolytic membrane at their ends being radially distant from the cylindrical surface of the base.

The object indicated above may be achieved according to a second aspect of the invention, which provides the support for oxygen separation membrane element to support a dense and cylindrical electrolytic membrane having oxygen ion permeability, comprises (a) a base axially extending and having a cylindrical surface extending axially and (b) a plurality of air passages guiding a gas in the axial direction of the base between the cylindrical surface of the base and the electrolytic membrane.

The object indicated above may be achieved according to a third aspect of the invention, which provides an oxygen separation membrane element comprising the support according to the first or second aspect of the invention supporting the dense and cylindrical electrolytic membrane having oxygen ion permeability.

According to the first aspect of the invention, the support for oxygen separation membrane element comprises a base (or an inner wall), a plurality of ribs outwardly projecting and extending in the radial direction from the outer surface of the base. As a result, an electrolytic membrane provided on the support of the element is supported by the ribs. Consequently, air passages extending in the axial direction are defined by the electrolytic membrane and the base. The size of the air passage depends upon the radial dimension of the rib (or the height) and the circumferential distance between the ribs. Introducing the air (or gas) to be treated for separation into and through the air passages causes nonnecessity (or unnecessariness) of radial permeation of the air through the base. Accordingly, no gas permeability is required for the base. The air can reach the electrolytic membrane without radial permeation through the base. For that reason, a dense base or a base having low porosity is available, and the base by itself can be facilitatively provided with high mechanical strength that is required for the support. Consequently, since only low mechanical strength is required for the ribs, larger air passages defined by the base and the electrolytic membrane can be provided, to increase an amount of oxygen diffusion from the base to the electrolytic membrane. As described above, a simple structure with a plurality of ribs standing on the outer surface of the base causes sufficient mechanical strength and a large amount of gaseous diffusion, to provide with a support for an oxygen separation membrane element having high gaseous diffusion characteristics that can be facilitatively fabricated.

According to the second aspect of the invention, the support for oxygen separation membrane element comprises a base (or an inner wall), a plurality of air passages defined by the base and the electrolytic membrane, and an air (or gas) is axially introduced into and through the air passages. Introducing the air to be treated for separation into and through the air passages causes nonnecessity (or unnecessariness) of radial permeation of the air through the base. Accordingly, no gas permeability is required for the base. The air can reach the electrolytic membrane without radial permeation through the base. For that reason, a dense base or a base having low porosity is available, and the base by itself can be facilitatively provided with high mechanical strength that is required for the support. Consequently, since only low mechanical strength is required for members other than the base in the air passages, larger air passages defined by the base and the electrolytic membrane can be provided, to increase an amount of oxygen diffusion from the base to the electrolytic membrane. As described above, a simple structure with a plurality of ribs standing on the outer surface of the base causes sufficient mechanical strength and a large amount of gaseous diffusion, to provide with a support for an oxygen separation mambrane element having high gaseous diffusion characteristics which can be facilitatively fabricated.

According to the third aspect of the invention, since the support for the oxygen separation membrane element having high gaseous diffusion characteristics which can be facilitatively fabricated is provided thereon with a dense and cylindrical electrolytic membrane having oxygen ion permeability, the air including oxygen is appropriately furnished to the electrolytic membrane, or oxygen which has permeated the electrolytic membrane can appropriately penetrate the support. It can appropriately loosen (or moderate) or avoid the dependency of the oxygen permeation characteristics of the oxygen separation membrane upon the gaseous diffusion characteristics of the support, to provide with an oxygen separation membrane of high oxygen permeation speed.

Preferably, the support for oxygen separation membrane element according to the first aspect of the invention, further comprising a membrane receiver having a plurality of pores axially penetrating the membrane receiver, on a plurality of the ribs for supporting the electrolytic membrane. In this embodiment, it is provided with the support capable of supporting or being covered with a further thinner electrolytic membrane due to its large area for supporting the electrolytic membrane, in comparison to another support having a structure being outwardly open at the outer ends of the ribs opposite to the base.

While the membrane receiver has a continuous structure in the circumferential direction in the embodiment, to the contrary, it may have a discontinuous structure in the circumferential direction. The membrane receiver may, for instance, have a projection circumferentially projecting along a cylindrical surface from the side surface of each end of a plurality of the ribs. In this embodiment, the projection may be provided on the both sides or one side of the rib in the circumferential direction. The discontinuous structure of the membrane receiver has through portions between the projections or between the projection and the rib. A dense substantial structure of the membrane receiver may be available if the total volume of the through portions is sufficiently large.

Preferably, the thickness of the membrane receiver is not more than 1 mm. In this embodiment, sufficiently thin porous membrane receiver for supporting the electrolytic membrane restrains reduction in the amount of gaseous diffusion in the membrane receiver. In contrast, as described above, the support without the base is required to have not less than 2 mm of the thickness of the portion corresponding to the membrane receiver, for the mechanical strength. The thickness of not more than 1 mm for the membrane receiver of the support according to the first aspect is sufficient in mechanical strength, due to the base having the mechanically sufficient strength even in an embodiment such that the porous membrane receiver supports the electrolytic membrane. A thin membrane of not more than 1 mm causes the smallest and negligible effect on gaseous diffusion characteristics even if it is the membrane having bent and small pores formed such as in the Imperfect Sintering Method. Thus, the support for oxygen separation membrane element having a further thinner electrolytic membrane can be achieved with mechanical strength.

While, as described above, the membrane receiver having the thickness of not more than 1 mm is preferable, the receiver having the thickness of a range of 0.2 to 1 mm is the most preferable. The receiver having the thickness of not more than 0.1 mm has considerably low mechanical strength and is difficult to be formed.

Preferably, the support according to the first and second invention is formed by extrusion. The support for oxygen separation membrane element comprises an axially extending base, and ribs and/or air passages also axially extending, and consequently, may have a substantially uniform transverse section with each other in the axial direction. Such a support is further easily fabricated by extrusion that easily achieves a long extruded product.

Preferably, the base is cylindrical with a substantially uniform transverse section with each other in the axial direction. Thus, the difference between the rib provided on the cylindrical inner surface and the membrane receiver in their thickness can be reduced, in comparison to the solid (that is, not hollow) base. Consequently, the product can be further easier formed by extrusion. Furthermore, reduction in prepared necessary materials causes further low-cost fabrication. Reduction in weight of the support causes easiness in handling, and reduction in mechanical strength required for apparatus with the oxygen separation membrane element causes further low-cost fabrication and transport.

It is preferable that the thickness of the base is in a range of 1 to 3 mm.

Preferably, the rib has the thickness of 0.5 to 2 mm. It is preferable that the rib has the thickness of not less than 0.5 mm because the rib is required to support the electrolytic membrane and membrane receiver to avoid their transformation within 10 percent in the radial direction. Concurrently, it is preferable that the rib is as thin as possible and has the thickness of not more than 2 mm because the thicker rib causes less flow of gas in the axial direction of the support.

It is preferable that the axial length of the rib is in a range of 0.5 to 10 mm. That preferable range is determined on the basis of the fact that the axially longer rib causes, advantageously, more flow of gas in section, but simultaneously, disadvantageously, reduction in mechanical strength.

Preferably, the base and the ribs are integrally formed. The joined of the base and the ribs respectively formed are available. Integrally forming, however, causes low cost in fabrication and achieves an advantageous product in mechanical strength, to balance both the advantage and the disadvantage.

The membrane receiver is formed in another process than the base and the ribs, and is joined on the ends of the ribs. The membrane receiver is, as described above, required to be porous, and as a result, the dense base can be employed, while a base is required to be superior in mechanical strength, to further easily achieve a superior support in mechanical strength. Preferably, the base and the ribs are integrally formed by such as extrusion, the membrane receiver is formed by such as tape forming, and then, the membrane receiver is wound on the base and the ribs, and burnt in whole to be an integral product.

The base, the ribs and the membrane receiver may be an integral structure. It is required to be in whole porous. Such a structure may have sufficient characteristics if the structure has sufficiently low porosity and the membrane receiver is sufficiently thin. Thus, the base and the ribs may be dense or porous.

Preferably, the ribs are provided on the outer surface of the base. The ribs are employed for supporting the electrolytic membrane with a distance from the base. For that reason, they are not necessarily provided on the outer surface of the base, and the ribs and the electrolytic membrane may be provided on the inner surface of the base if a cylindrical base is applied. It is, however, preferable that the product has the ribs on the outer surface of the base due to easy fabrication.

Preferably, the electrolytic membrane may be provided by winding an electrolytic material formed by tape forming in advance on the ribs, for fabrication of the oxygen separation membrane element. Or, the electrolytic membrane may be provided by coating the surface of the membrane receiver with an electrolytic material in an appropriate manner such as dip coating. In any case, a burning step is applied if required.

Preferably, the ribs may be provided on the cylindrical surface to radially and outwardly extend in all directions. The ribs may be, for instance, provided in a range of 10 to 90 degrees each in the circumferential direction.

Preferably, the support for oxygen separation is made of ceramic. The ceramic support is preferable, as described above, to achieve anti-reduction, anti-moisture and high mechanical strength because it is disclosed at high temperature, under high pressure, in a reduction mood and moisture mood, and it requires an affinity to an electrolytic thin layer.

Preferably, the support for oxygen separation membrane element is made of at least one ceramic material selected from a group of the following (1)-(6):

(1) Perovskite composite oxide defined by the general formula of $Ln_{1-x}Ae_xMO_3$ (where Ln represents at least one selected from a group of lanthanoids, Ae represents at least one selected from Sr, Ca and Ba, M represents at least one selected from Fe, Mn, Ga, Ti, Co, Ni, Al, In, Sn, Zr, V, Cr, Zn, Ge, Sc and Y, and $0 \leq x \leq 1$);
(2) Stabilized zirconia;
(3) Cerium oxide;
(4) Magnesium oxide;
(5) Composite material of at least two selected from a group of (1)-(4); and
(6) Composite material of at least one selected from a group of (1)-(5), and at least one selected from a group of silicon oxide, silicon nitride, titanium oxide and aluminum oxide.

The above perovskite composite oxide, in general, is a mixed conductor having both high oxygen ion conductivity and high electron conductivity, although depending upon a composition of elements, or a ratio of the A-site element and B-site element. A composite material of the perovskite composite oxide and another materials described above is a mixed conductor too. The support made of such a mixed conductor causes the oxygen separation membrane element to require no external electrode or no external circuit. Consequently, a simple device or structure is advantageously achieved.

Since a thermal expansion coefficient of the electrolytic membrane of the oxygen separation membrane element approximates to that of the support for oxygen separation membrane element made of the above perovskite compound, damages due to the difference between the thermal expansion of the membrane and that of the support are preferably avoided upon heated or cooled in the fabrication process or in use.

Especially, such as $LaSrGaFeO_3$, $LaSrTiFeO_3$, $LaSrCoO_3$ and $LaSrMnO_3$ of the lanthanoids (or lanthanide series) perovskite composite oxide have high ion conductivity and high electron conductivity, and the support by itself advantageously has oxygen permeation characteristics.

Stabilized zirconia and cerium oxide is inferior to the above lanthanoids perovskite composite oxide in oxygen ion conductivity and electron conductivity, and, to the contrary, stabilized zirconia and cerium oxide is superior to lanthanoids perovskite composite oxide in mechanical strength. Stabilized zirconia and cerium oxide may be thus preferably employed for the support requiring mechanically comparatively high strength. Any stabilizer (or stabilizing agent) such as yttria, ceria and magnesia may be applied and added for stabilized zirconia.

Silicon oxide, silicon nitride, titanium oxide, aluminum oxide and magnesium oxide have low electron conductivity, and they have considerably low oxygen ion conductivity comparing to lanthanoids perovskite composite oxide. However, advantageously, the materials for them can be furnished in comparatively low cost, and they are superior in mechanical strength. For those reasons, not only the composite material of the above-described (6), but also silicon oxide, silicon nitride, titanium oxide, aluminum oxide and magnesium oxide can be employed for the support.

DETAILED DESCRIPTION OF EXEMPLARY EMBODIMENTS

Hereinafter, there will be described the present invention by reference to the drawings. The figures are appropriately simplified or transformed, and all the proportion of the dimension and the shape of a portion or member may not be reflective of the real one in the following embodiments.

Figure 1:
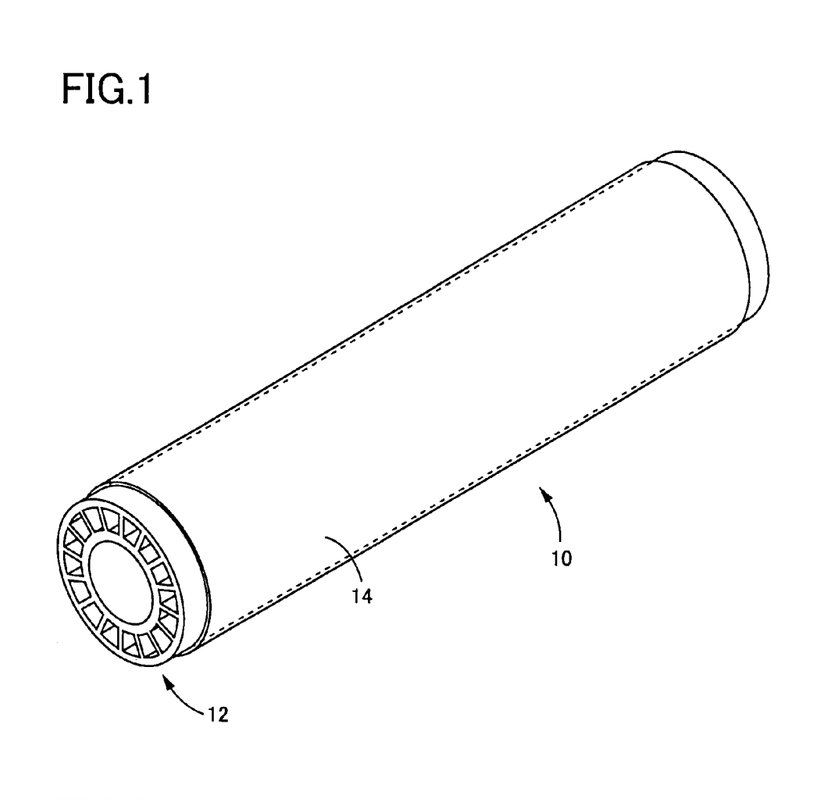
FIG. 1 illustrates an oxygen separation membrane element in whole in a perspective view according to an embodiment of the present invention.

FIG. 1 illustrates an oxygen separation membrane element 10 in whole in a perspective view according to an embodiment of the present invention. The element 10 comprises a cylindrical support 12 and an electrolytic membrane 14 which is fixed on the surface of the support 12.

Figure 2:
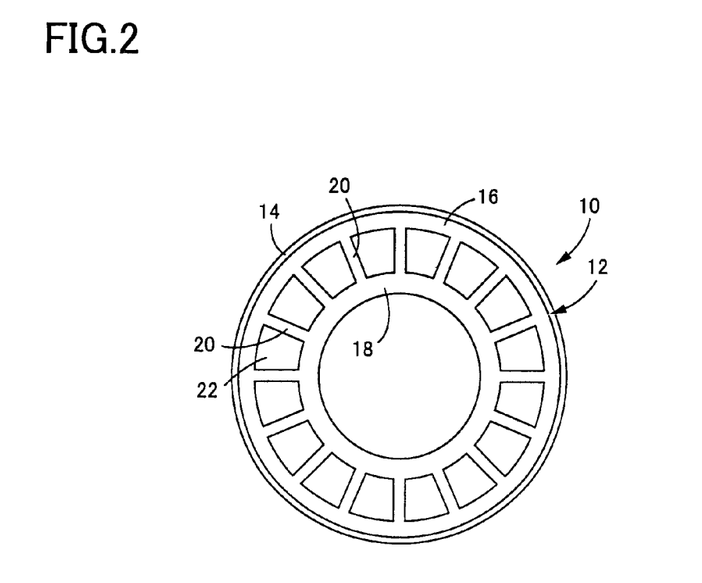
FIG. 2 illustrates an end surface of the element in FIG. 1.

The support 12 has a substantially cylindrical shape of, for instance, about 20 mm in the outer diameter, 11 mm in the inner diameter and 300 mm in length (or in the axial direction). FIG. 2 illustrates an end surface of the element 10. The support 12 comprises an outer wall 16 of, for instance, about 20 mm in the outer diameter and 18 mm in the inner diameter, an inner wall 18 of, for instance, about 14 mm in the outer diameter and 11 mm in the inner diameter, and, for instance, sixteen ribs (or rib-like walls or rib-like members) 20 connecting the outer wall 16 and the inner wall 18.

The support 12 is a porous member that is made of, for instance, $LaSrTiFeO_3$ and has the porosity of about 30%. The outer wall 16 of the support 12 has a thickness of about 0.2-1 mm and the inner wall 18 has a thickness of about 1.5 mm. The rib 20 has a uniform thickness of, for instance, about 1 mm, and are disposed and equally spaced with an angle of 22.5° each, in a circumferential direction of the outer and inner walls 16, 18. As a result, sixteen air passages 22 are formed and extend in the axial (or longitudinal) direction of the support 12, defined by the outer and inner walls 16, 18 and the ribs 20 which have a plurality of pores that are bent, and communicated and penetrate in the respective thickness directions.

The electrolytic membrane 14 is made of a mixed conductor material such as $LaSrGaFeO_3$ and a thin dense layer of the thickness of, for instance, about 100 μm. The inner wall 18 corresponds to a base or base portion and the outer wall 16 corresponds to a membrane receiver or membrane receiving portion.

Figure 3:
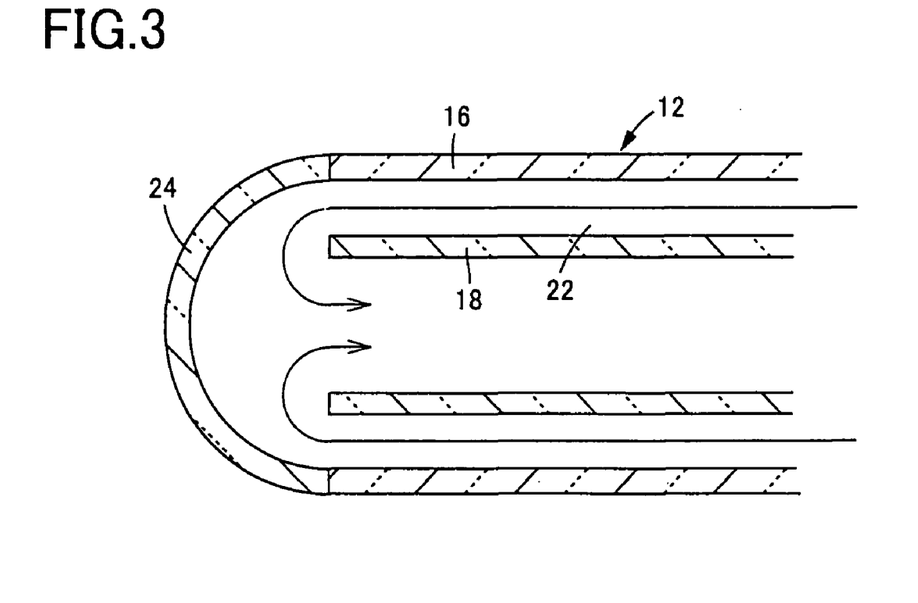
FIG. 3 illustrates a diagram of a part of the element in FIG. 1 in use.

In FIG. 3 the support 12 of the above-constituted oxygen separation membrane element 10 has a closed end with, for instance, a hemispherical cap 24. The element 10 is maintained at a predetermined temperature such as about 1000° C., air including oxygen is introduced into the air passages 22 at the other end (not shown) of the element 10, and oxygen in the introduced air permeates the outer wall 16 to be collected. The electrolytic membrane 14 is not shown in FIG. 3.

In this embodiment, the support 12 comprises the inner wall 18, the sixteen ribs 20 outwardly projecting and extending in the radial direction from the outer surface of the inner wall 18 (corresponding to the cylindrical surface of the base), and the outer wall 16. As a result, the electrolytic membrane 14 provided on the support 12 of the element 10 is supported by the ribs 20 through the outer wall 16. Consequently, the air passages 22 extending in the axial direction are formed between the electrolytic membrane 14 and the inner wall 18. The size of the air passage 22 depends upon the dimensions of the rib 20, that is, the height and the circumferential distance between the ribs 20. The support 12 has, as a whole, mechanically sufficient strength with the outer wall 16 supported by the inner wall 18 and the ribs 20, irrespective of thin porous outer wall 16 of about 0.2-1.0 mm in its thickness. The invention according to this embodiment can provide with the support 12 having mechanically sufficient strength, with the sufficiently thin outer wall 16 in its thickness in order to achieve a sufficiently large amount of oxygen diffusion.

Figure 4:
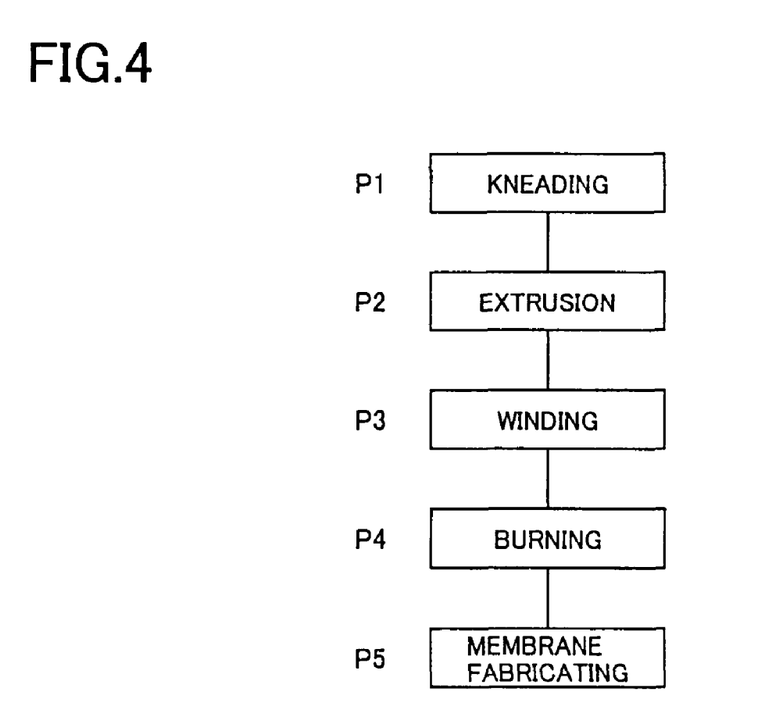
FIG. 4 illustrates an outline of the fabrication process of the element in FIG. 1.

There will be described below an example of fabrication or manufacturing of the oxygen separation membrane element 10 in FIG. 4.

In the kneading step P1, powder material including such as $LaSrTiFeO_3$, alumina and zirconia (or zirconium oxide) is prepared to form the support 12, and kneaded with sequentially adding wax, solvent, dispersant, binder and plasticizer by, for instance, a kneader in about twenty minutes to prepare a body or prepared mixture material for extrusion. The solvent is appropriately selected in consideration for the kind of such as the binder. For example, water is selected for the solvent. For the binder, for instance, methylcellulose is selected, and for the plasticizer such as ethylene glycol is selected.

In the extrusion step P2, the support 12 is formed by extruding the body or prepared mixture material from the mouthpiece of the predetermined shape provided on an extrusion apparatus. The extruded material is dried at, for instance, a range of about a room temperature to 100° C. The extrusion condition is determined about 60 revolutions a minute of the auger revolutions, and about 50 bar (or $5 \times 10^6$ Pa) of the extrusion pressure. The values of the auger revolutions and the extrusion pressure are appropriately determined depending upon a shape of the extruded support, thickness of each portion, and mixing proportion of the body or prepared mixture material which is determined depending upon raw materials.

In the winding step P3, for instance, a formed material for the outer wall 16 which is formed in another process is wound on the extruded material for the support 12 at its outer circumference. This winding step P3 is omitted in this process if the inner wall 18, ribs 20 and outer wall 16 are integrally formed.

In the burning step P4, the extruded material is burnt at a appropriate temperature and for appropriate time duration which is determined depending upon used raw materials, for instance, the above-mentioned material is to be burnt at 1400° C. for six hours. In this step, the porous support 12 having about 30% in porosity is achieved by in a degree developing of the extruded material in sintering.

In the membrane fabrication step P5, an electrolytic slurry is prepared by mixing materials constituting the above-mentioned electrolytic membrane 14 with solvent, binder, plasticizer and dispersant. Then, the above-mentioned support 12 is dipped in the electrolytic slurry to coat the support 12 with in the electrolytic slurry at the outer circumferential surface. Next, this is dried, and maintained burnt at a predetermined temperature determined depending upon materials in the electrolytic slurry, for instance, at about 1000-1600° C. for about three hours in the atmosphere to complete the dense electrolytic membrane 14 made of the electrolytic slurry, consequently, to complete the oxygen separation membrane element 10.

Table 3 shows results in evaluation of characteristics of the support 12 and the element 10 which are fabricated with various materials in the above-mentioned constitution and process or method for fabrication. "Materials of Membrane" in Table 3 corresponds to materials constituting the electrolytic membrane 14, and values represent amounts of oxygen permeation which were measured by a gas permeation amount measurement device 50 in FIG. 5, at 1000° C., with 1 (one) L/min of the flow speed of $CH_4$, 3 (three) L/min of the flow speed of air, and 0 (cipher) of the ratio of water vapor/methane (s/c). Other conditions such as a shape and dimensions of the element 10 than variations in the materials of the support and membrane, that is, electrolyte were equalized in each element 10.

TABLE 3

Practical Amount of Oxygen Permeation (cc/min/cm²)

| Materials of Support | Materials of Membrane | | | | |
|---|---|---|---|---|---|
| | $LaSrGaFeO_3$ | $LaSrTiFeO_3$ | $LaSrCoFeO_3$ | $LaSrZrFeO_3$ | $LaSrAlFeO_3$ |
| Alumina | 28 | 27 | 27 | 26 | 29 |
| Zirconia | 27 | 29 | 29 | 27 | 28 |
| Ceria | 29 | 30 | 29 | 29 | 29 |
| Magnesia | 32 | 30 | 31 | 31 | 31 |
| $LaSrMnO_3$ | 31 | 31 | 32 | 30 | 30 |
| $LaSrCoO_3$ | 33 | 34 | 33 | 32 | 31 |
| $LaSrGaFeO_3$ | 29 | 31 | 33 | 31 | 32 |
| $LaSrTiFeO_3$ | 30 | 34 | 32 | 34 | 32 |

Figure 5:
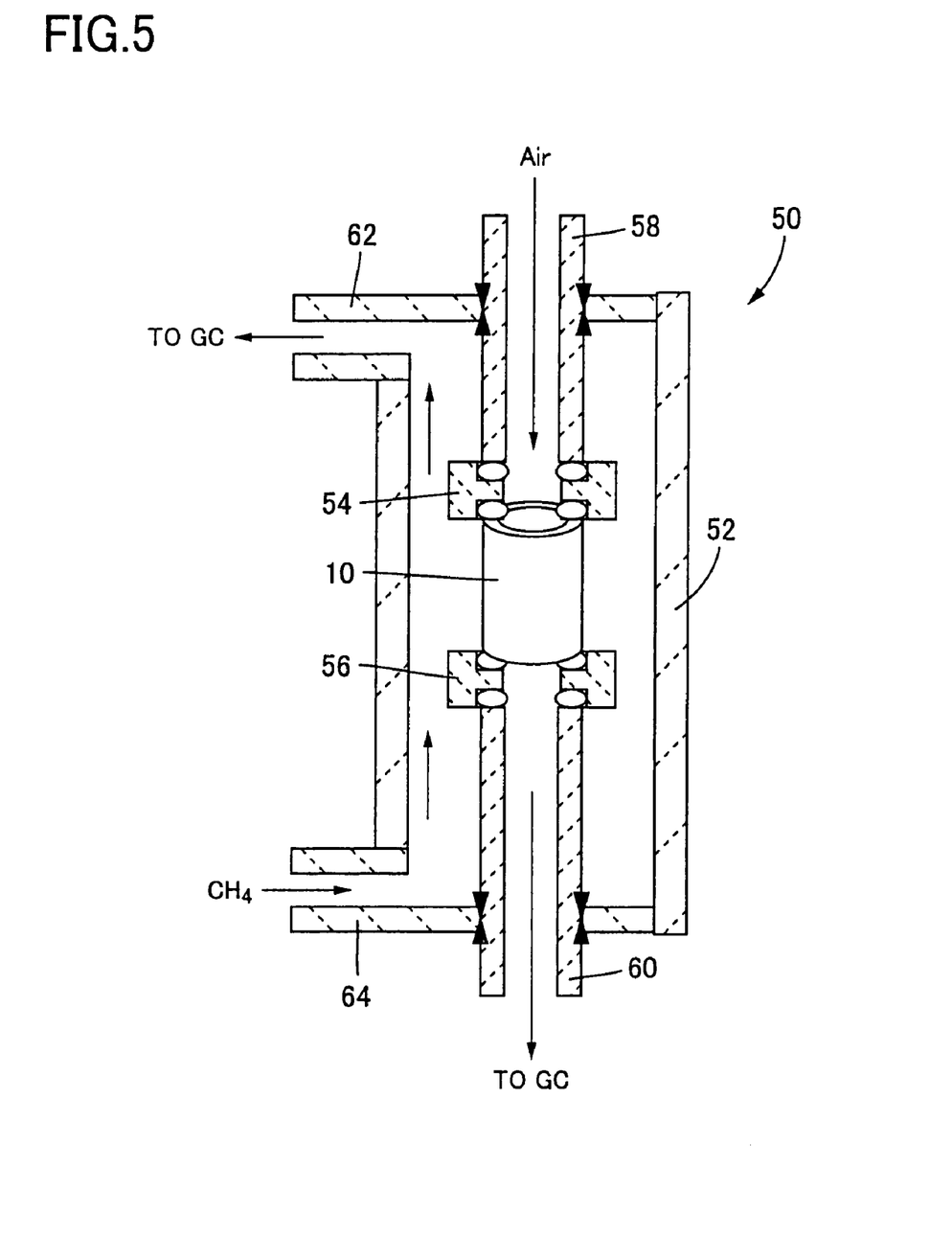
FIG. 5 illustrates a device for measurement of oxygen permeation speed of the element.

In FIG. 5 the gas permeation amount measurement device 50 comprising a cylindrical housing 52 of such as silica glass, an upper tube 58 and a lower tube 60 of such as alumina in the housing 52, and between the upper and lower tubes 58, 60 a sample, that is, the oxygen separation membrane element 10 is disposed through an upper fixture 54 and a lower fixture 56 of such as alumina respectively. At the ends of the cylindrical housing 52 an upper conduit 62 and a lower conduit 64 of such as mullite are respectively mounted, and the device 50 is closely sealed both at the upper and lower portions where the upper tube 58 is inserted into the upper conduit 62 and the lower tube 60 is inserted into the lower conduit 64. A unit of the element 10, the upper and lower fixtures 54, 56 and the upper and lower tubes 58, 60 is closely sealed with glass at respective connected portions.

Measurement of oxygen permeation amount by the gas permeation amount measurement device 50 is performed as follows. The inside of the device 50 is heated by such as a heater (not shown) and maintained at about 1000° C. The air, that is, a gas including oxygen is introduced through the upper tube 58 and simultaneously hydrocarbon such as pure gaseous methane is introduced through the lower conduit 64. Then oxygen in the exhaust air from the lower end of the oxygen separation membrane element 10 as seen in FIG. 5 and through the lower tube 60 is measured, and the oxygen in the exhaust gas through the upper conduit 62 is also measured by gas chromatography. The calculated results on the basis of the measured values are shown in Table 3, and the results correspond to the amounts of oxygen which has permeated through the structure (or walls) of the element 10.

It is found that very large amount of oxygen permeation of about 26-34 cc/min/cm² is achieved in any combination of support and membrane materials in this embodiment as shown in Table 3. In this embodiment the electrolytic membrane 14 is supported by the outer wall 16 having a thickness of substantially 0.2-1.0 mm, a plurality of the air passages 22 extending in the longitudinal direction of the element 12 in the inner side of the outer wall 16 is provided, and through the inner side of the support 12 a sufficiently large amount of air is furnished. Consequently, such a large amount of oxygen permeation mentioned above is achieved by the benefits of superior material characteristics of the electrolytic membrane 14.

Figure 6:
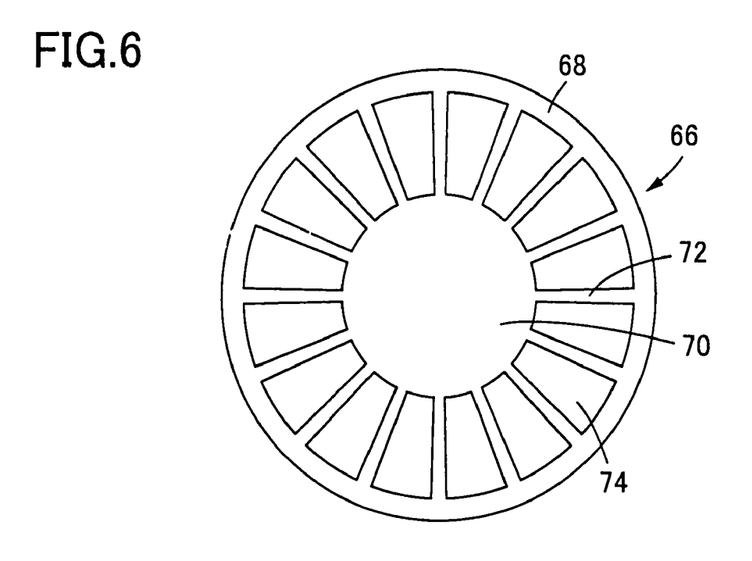
FIG. 6 illustrates an end surface of a support in another embodiment of the present invention.

FIG. 6 corresponding to FIG. 2 of the previous embodiment illustrates an end surface of a support 66 in another embodiment according to the present invention. As shown in FIG. 6, the support 66 comprises a tubular outer wall 68, a cylindrical core (or inner base member) 70, a plurality of ribs (or rib-like walls or rib-like members) 72 connecting the outer wall 68 and the cylindrical core 70, at the inner surface of the outer wall 68 and at the outer surface of the cylindrical core 70 respectively. The ribs 72, in the same manner as the ribs 20 in the previous embodiment, axially (or longitudinally) and radially extend in the axial (or longitudinal) and radial directions of the support 66. The ribs 72 stand at the cylindrical outer surface of the cylindrical core 70 and support the outer wall 68, spaced between the core 70 and the outer wall 68. As a result the ribs 72 cause sixteen air passages 74, defined by the core 70, the outer wall 68 and the ribs 72.

The whole support 66 is made of porous material as the support 12. The thickness of the outer wall 68 is about 0.2-1.0 mm as the outer wall 16 of the support 12 in the previous embodiment. Also in this embodiment the support 66 covered with the dense electrolytic membrane 14 on its outer surface functions as an oxygen separation membrane element 10.

An air (or gas) including oxygen is introduced into the air passages 74 of the element 10 having the outer wall 68 with the electrolytic membrane 14 thereon. Then the air enters the thin outer wall 68 through its pores toward and to the outer surface when the air flows in the axial (or longitudinal) direction. The reached air to the outer surface of the outer wall 68 meets the electrolytic membrane 14, and oxygen in the air is ionized and permeates the membrane 14.

The element 10 having the support 66 cannot be provided with the cap 24 as shown in FIG. 3 such that the air is introduced into the support 66 through all air passages 74 and entered the outer wall 68 at the inner surface through its pores toward and to the outer surface, because the core 70 of the support 66 is solid, that is, is not hollow. Instead, the element 10 is available for oxygen separation if the element 10 is provided such that the air is introduced into the support 66 at one end of the air passage 74 and exhausted from the other end, or such that the support 66 is provided with the cap 24 and the air is introduced through at least one air passage 74 and exhausted through the other air passages 74.

Figure 7:
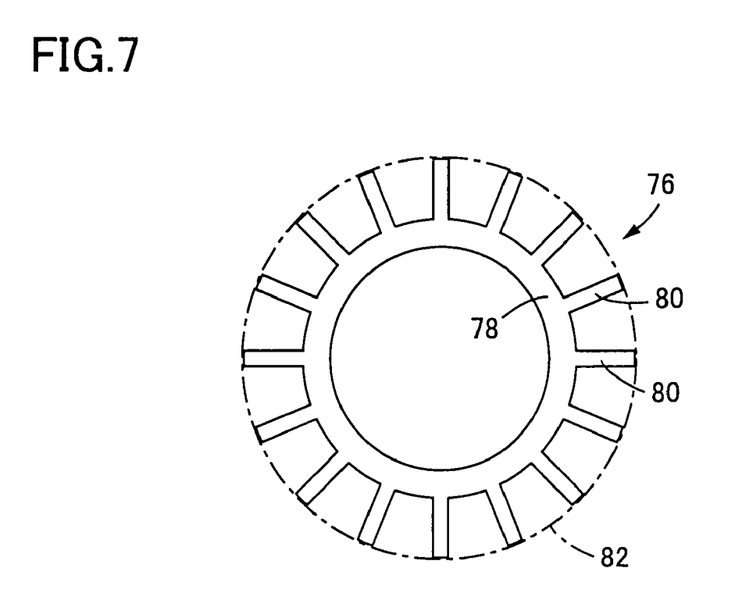
FIG. 7 illustrates an end surface of a support in further embodiment of the present invention.

FIG. 7 illustrates a support 76 according to another embodiment of the present invention. The support 76 comprises a cylindrical inner wall 78 and sixteen ribs 80 which stand on the outer surface of the inner wall 78 and radially and axially (or longitudinally) extend outwards. The structure of the support 76 having the inner wall 78 and ribs 80 is outwardly open at the outer ends of the ribs 80, and is not provided with any outer wall. The whole support 76 is, for instance, made dense such that it has no air permeability or lowermost air permeability.

The support 76 is available if it is, for instance, provided with a cylindrical membrane 82 on the outer ends of the ribs 80 as shown by a dot and dashed line in FIG. 7. A porous cylindrical membrane 82, for instance, functions as a membrane for supporting the electrolytic membrane 14, that is, a membrane receiver, and accordingly, the combination of the support 76 and the porous cylindrical membrane 82 functions as the support 12. Since both the inner wall 78 and the ribs 80 of the support 76, then, are not required to have air permeability, a wholly dense support 76 is available. Consequently, the support 76 has an advantage of higher mechanical strength in comparison to the support 12 which is integrally provided with a portion functioning as a membrane receiver for the electrolytic membrane 14.

An oxygen separation membrane element having a dense electrolytic membrane 82 which functions as the electrolytic membrane 14 and has no membrane receiver, functioning as the element 10 can be achieved. Such an element has an advantage of affecting gaseous diffusion, by the support 76, very slightly, with spaces defined by the electrolytic membrane 14 and the inner wall 78 functioning as air passages, in comparison to the element having the porous membrane receiver which supports the electrolytic membrane 14 on its surface.

In the above embodiment, the ribs 80 are varied to be appropriately formed, sized and disposed on the surface of the inner wall 78 for appropriately supporting the cylindrical membrane 82 by their outer ends. Thicker ribs 80 may, for instance, be available to receive the electrolytic membrane 14 on their wider ends, and/or more ribs 80 may be provided and formed on the inner wall 78.

It is to be understood that the present invention may be embodied with other changes, improvements, and modifications that may occur to a person skilled in the art without departing from the scope and spirit of the invention defined in the appended claims.

What is claimed is:

1. An oxygen separation membrane element comprising a support to support a dense and cylindrical electrolytic membrane having oxygen ion permeability, the support including:
    a base longitudinally extending and having a cylindrical surface extending axially; and
    a plurality of ribs formed on the cylindrical surface of the base, radially projecting and axially extending, for supporting the electrolytic membrane at their ends being radially distant from the cylindrical surface of the base,
    the support being made of at least one of alumina, zirconia, ceria, $LaSrCoO_3$, $LaSrGaFeO_3$, and $LaSrTiFeO_3$,
    wherein the electrolytic membrane is disposed directly on the ends of the plurality of ribs.

* * * * *